(No Model.)
E. A. FLETCHER.
SEPARABLE OBJECT LESSON KEYBOARD.
No. 603,629. Patented May 10, 1898.
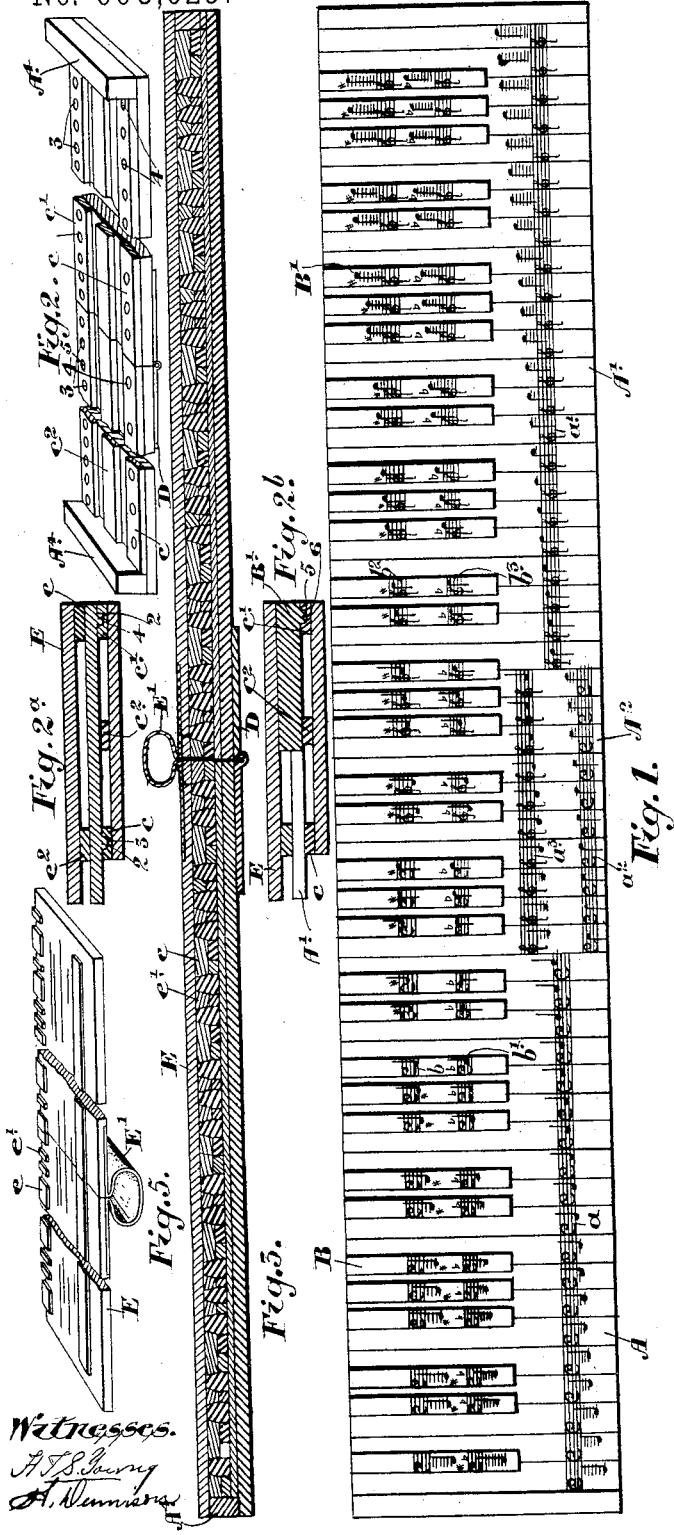
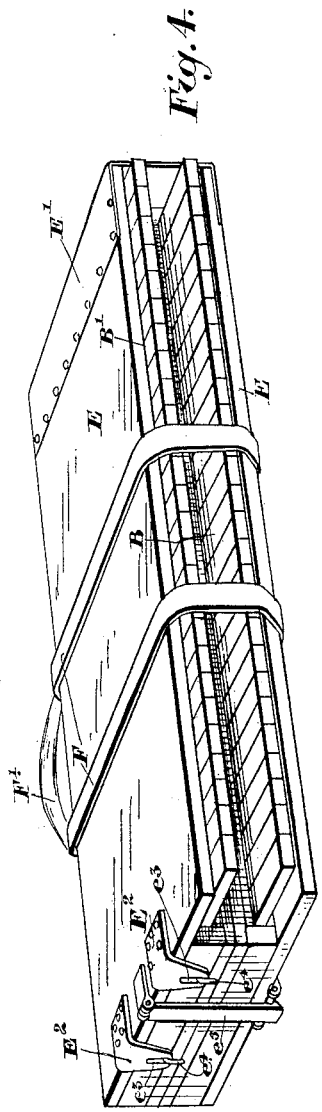
Witnesses.
Inventor:
E. A. Fletcher
by Fetherstonhaugh & Co.
Attys.

UNITED STATES PATENT OFFICE.

EVELYN ASHTON FLETCHER, OF TORONTO, CANADA.

SEPARABLE OBJECT-LESSON KEYBOARD.

SPECIFICATION forming part of Letters Patent No. 603,629, dated May 10, 1898.

Application filed April 13, 1897. Serial No. 631,969. (No model.)

*To all whom it may concern:*

Be it known that I, EVELYN ASHTON FLETCHER, teacher of music, of the city of Toronto, in the county of York, in the Province of Ontario, Canada, have invented certain new and useful Improvements in Separable Object-Lesson Keyboards, of which the following is a specification.

My invention relates to improvements in separable object-lesson keyboards more particularly adapted for teaching pupils the piano; and the object of the invention is to design a portable form of keyboard whereby a pupil may be thoroughly familiarized with the notes of a keyboard of a piano and their relative arrangement and position as to each other and as to the treble and bass staves and leger lines and notes thereon in sheet-music; and it consists, essentially, in providing on what are known as the "white" keys of the piano in both treble and bass and the center of the piano the representation of a staff and notes peculiar to the situation of the individual key, and upon what are known as the "black" keys of a piano the representation of a staff and notes representing both sharps and flats, each white and black key being separable from the base in which they are held in juxtaposition to each other by depending projections, the keyboard being preferably hinged in the center, and a carrying-cover preferably in two parts being also provided with blocks fitting between the black keys, so as to hold all the keys in position, as hereinafter more particularly explained.

Figure 1 is a plan view of my improved learner's keyboard. Fig. 2 is a perspective view, on a smaller scale than Fig. 1, of the base of the keyboard with the keys removed, such base being intermediately broken away at each side of the central hinge. Fig. 2$^a$ is a cross-section showing the manner in which each white key is supported and held in position on the base and also for transportation. Fig. 2$^b$ is a similar view showing how each black key is held on the base and for transportation. Fig. 3 is a longitudinal section through the keyboard with cover fastened in position ready to be folded for transportation, the section being through the rear strips. Fig. 4 is a perspective view of the keyboard ready for transportation. Fig. 5 is a perspective view, on the same scale as Fig. 2, of the retaining-cover, showing it intermediately broken away.

In the drawings like letters and numerals of reference indicate corresponding parts in each figure.

It is intended in this invention that the portions of the staff and note on each key may be utilized not only on a dumb keyboard, such as hereinafter described, but on the actual keyboard of a piano by utilizing strips containing the staff and notes, which may be pasted on each key temporarily and removed after the pupil has become familiar with such keys.

A are the bass white keys, A' the treble white keys, and A$^2$ the central white keys.

B are the bass black keys, and B' the treble black keys, which, of course, represent sharps or flats.

Each of the bass white keys A has a portion of the staff with bass cleff and note, each of which portions I designate $a$. The treble white keys A' have each staff portion $a'$ with treble cleff and note corresponding to key imprinted on it. The central keys A$^2$ have, preferably, staff portions $a^2$ and $a^3$ having the bass cleff and treble cleff, respectively, on the staff and the corresponding notes in the bass and treble of each imprinted on them. The black bass keys B have each two staff portions $b$ and $b'$ imprinted or marked on them, representing the sharp and flat of each key. The black treble keys B' have each two staff portions $b^2$ and $b^3$ imprinted on them, representing the sharp and flat of each key.

Each white note has two depending projections 2, which fit into corresponding holes 3 and 4 in the front and rear longitudinal strips $c$ and $c'$ of the supporting-base. (See Figs. 2 and 2$^a$.)

$c^2$ is an intermediate longitudinal strip, which supports the front ends of the black keys B and B'. The rear end of each black key has a depending projection 5, which extends into a hole 6 in the longitudinal strip $c'$. The front end of each black key B rests upon the central strip $c^2$.

D is the hinge by which the central ends of the base C are connected together.

E are the cover-boards, which are provided with the wide blocks $e$ and the narrow blocks $e'$. These blocks are designed to project downwardly from the cover-boards, so that the bottoms of the blocks rest upon the top of the flat keys at the rear or back of the keyboard.

$e^2$ are longitudinal strips fastened to the cover-board near the front edge thereof and designed to rest upon the front ends of the white keys. The cover-boards are in two parts, connected together by a flexible strap $E'$, preferably the full width of the board, and when placed in the position shown in Fig. 3, with the ends of the cover-board fastened to the end bars $A^4$, attached to the base, serve to securely hold the loose keys in position.

To fasten the ends of the cover-boards to the bars $A^4$, I provide the corner metal straps $E^2$, having slots $e^3$, through which extend the L-shaped staples $e^4$. The ends of the keyboard and cover when folded for transportation, as shown in Fig. 4, are fastened together by a suitable clasp $e^5$. In this condition a pair of ordinary shawl-straps F may be passed across and around the folded board, which may be carried by a handle $F'$, such as used in connection with shawl-straps.

The use of the board as shown in Figs. 1 and 2 will be readily understood by those accustomed to the teaching and study of music and of the pianoforte in particular, and its advantage will readily be comprehended by the same class. A pupil will naturally soon understand the position of the keys on the piano, their relative value, and their relation to the staves in a sheet of music, thus facilitating the rapid learning of the notes by beginners.

In order to more fully impress upon the minds of the young the various positions of the several keys forming the keyboard and their values, the keys being separable may be entirely removed and mixed together by the teacher and the placing of them in their proper relative position on the base will soon serve to indelibly fix such relative position and value upon the mind. Although I show the staves and notes for each key indited directly on each key, it will be understood that they might be applied opposite each key instead; but I prefer the form shown.

What I claim as my invention is—

1. A device for teaching pianoforte comprising the separable white and black keys having the staves and notes of the musical notation indited thereon, depending projections on the white keys, a base, longitudinal strips thereon with holes to receive the depending projections, depending projections on the black keys, the rear strip provided with holes between the white keys designed to receive the projections on the black keys and a longitudinal strip supported on the base and designed to form a rest for the front ends of the black keys as and for the purpose specified.

2. In combination the separable white and black keys, the base for supporting the same, a cover-board provided with intervening blocks to fit between the black keys and rest upon the white keys at the rear and a longitudinal strip attached to the cover designed to rest upon the white keys immediately in front of the black keys and means for holding the cover to the keyboard so as to retain the keys in position as and for the purpose specified.

3. In combination the separable white and black keys, the base for supporting the same constructed in two parts and hinged together, a cover-board formed in two parts, a flexible elongated loose connection between the parts designed to allow of the two parts of the base being folded on each other and fastening devices for connecting the free ends of the cover and base together as specified.

EVELYN ASHTON FLETCHER.

Witnesses:
  B. BOYD,
  A. McADAM.